US008478518B2

(12) United States Patent
Nagase

(10) Patent No.: US 8,478,518 B2
(45) Date of Patent: Jul. 2, 2013

(54) TRAFFIC INFORMATION PROCESSING SYSTEM, STATISTICAL PROCESSING DEVICE, TRAFFIC INFORMATION PROCESSING METHOD, AND TRAFFIC INFORMATION PROCESSING PROGRAM

(75) Inventor: Kenji Nagase, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 264 days.

(21) Appl. No.: 12/733,584

(22) PCT Filed: Feb. 24, 2009

(86) PCT No.: PCT/JP2009/053799
§ 371 (c)(1), (2), (4) Date: Mar. 10, 2010

(87) PCT Pub. No.: WO2009/116379
PCT Pub. Date: Sep. 24, 2009

(65) Prior Publication Data

US 2010/0174474 A1 Jul. 8, 2010

(30) Foreign Application Priority Data

Mar. 18, 2008 (JP) ................................ 2008-069950

(51) Int. Cl.
*G01C 21/00* (2006.01)

(52) U.S. Cl.
USPC ............ 701/414; 701/117; 701/118; 701/423

(58) Field of Classification Search
USPC ................................ 701/118, 117, 414, 423
See application file for complete search history.

(56) References Cited

U.S. PATENT DOCUMENTS

| | | | | |
|---|---|---|---|---|
| 5,962,833 | A * | 10/1999 | Hayashi | 235/384 |
| 6,195,019 | B1 * | 2/2001 | Nagura | 340/928 |
| 6,340,934 | B1 * | 1/2002 | Hisada | 340/928 |
| 6,658,392 | B2 * | 12/2003 | Yoshida | 705/13 |
| 6,781,523 | B2 * | 8/2004 | Matsui et al. | 340/910 |
| 7,407,097 | B2 * | 8/2008 | Robinson et al. | 235/384 |
| 7,561,958 | B2 * | 7/2009 | Tomita et al. | 701/423 |
| 7,676,392 | B2 * | 3/2010 | Hedley et al. | 705/13 |
| 8,335,711 | B2 * | 12/2012 | Burdick | 705/13 |
| 2002/0049527 | A1 | 4/2002 | Kohno et al. | |
| 2002/0049529 | A1 * | 4/2002 | Ikeda | 701/200 |
| 2002/0145542 | A1 * | 10/2002 | Yamashita | 340/935 |

(Continued)

FOREIGN PATENT DOCUMENTS

| | | |
|---|---|---|
| DE | 101 36 342 A1 | 3/2002 |
| JP | A-2002-216187 | 8/2002 |

(Continued)

OTHER PUBLICATIONS

International Search Report issued in International Patent Application No. PCT/JP2009/053799 by the International Bureau on Jul. 6, 2009.

(Continued)

*Primary Examiner* — Mary Cheung
*Assistant Examiner* — Truc M Do
(74) *Attorney, Agent, or Firm* — Oliff & Berridge, PLC

(57) ABSTRACT

A navigation device mounted in a vehicle determines a traffic condition when the vehicle travels in a road zone along a facility, and determines whether a payment terminal mounted in the vehicle has made a payment through communication with a facility terminal installed in the facility. If it is determined that a payment has been made through communication, then probe data is generated that associates the traffic condition in the road zone with a payment service of the facility.

5 Claims, 9 Drawing Sheets

U.S. PATENT DOCUMENTS

| | | | | |
|---|---|---|---|---|
| 2004/0127217 | A1 * | 7/2004 | Aoki et al. | 455/435.1 |
| 2004/0230480 | A1 * | 11/2004 | Kanayama | 705/13 |
| 2005/0083866 | A1 * | 4/2005 | Kubotani et al. | 370/310 |
| 2005/0086100 | A1 * | 4/2005 | Yanagisawa et al. | 705/13 |
| 2006/0267801 | A1 * | 11/2006 | Tomita et al. | 340/988 |
| 2007/0150169 | A1 * | 6/2007 | Tomita et al. | 701/117 |
| 2007/0278300 | A1 | 12/2007 | Dawson et al. | |
| 2011/0099126 | A1 * | 4/2011 | Belani et al. | 705/418 |

FOREIGN PATENT DOCUMENTS

| | | |
|---|---|---|
| JP | A-2002-310684 | 12/2002 |
| JP | A-2004-005502 | 1/2004 |
| JP | B2-3686943 | 8/2005 |
| JP | A-2006-252533 | 9/2006 |
| JP | A-2007-147567 | 6/2007 |
| WO | WO 2007/120833 A2 | 10/2007 |

OTHER PUBLICATIONS

Written Opinion issued in International Patent Application No. PCT/JP2009/053799 by the International Bureau on Jul. 6, 2009.

Japanese Patent Office, Notification of Reason(s) for Refusal mailed Oct. 4, 2011 in Japanese Patent Application No. 2008-069950 w/Partial English-language Translation.

* cited by examiner

TRAFFIC INFORMATION PROCESSING SYSTEM, STATISTICAL PROCESSING DEVICE, TRAFFIC INFORMATION PROCESSING METHOD, AND TRAFFIC INFORMATION PROCESSING PROGRAM

TECHNICAL FIELD

The present invention relates to a traffic information processing system, a statistical processing device, a traffic information processing method, and a traffic information processing program.

BACKGROUND ART

The development of intelligent transport systems has been progressing in recent years with the aim of supporting smooth automobile travel. For example, in the event of traffic congestion occurring in a particular road zone, a known system communicates the zone with traffic congestion to a vehicle on a road in the vicinity using road-to-vehicle communication or the like.

An example of such a system is described in Japanese Patent Application Publication No. JP-A-2003-288673, where a system monitors a fixed zone on a road using vehicle detection equipment, and determines a staying state of vehicles in each lane. If the staying of vehicles is detected in a left-turn lane in the vicinity of a facility, then the system determines that the vehicles are staying in the lane due to a large number of vehicles waiting to make a left turn, and communicates the congestion arising from the vehicles waiting to make a left turn to surrounding vehicles.

However, although the above system is capable of determining that vehicles are staying in the left-turn lane, the system cannot provide detailed information pertaining to a factor of such congestion. In other words, the system cannot determine whether the congestion has occurred because of staying vehicles waiting to park in a parking lot for the facility, or has occurred because of staying vehicles waiting to use a so-called drive-through.

SUMMARY OF THE INVENTION

The present invention was devised in view of the foregoing problem, and it is an object of the present invention to provide a traffic information processing system, a statistical processing device, a traffic information processing method, and a traffic information processing program, which are capable of generating detailed information pertaining to a road zone along a facility.

In order to solve the above problem, a traffic information processing system according to a first aspect of the present invention includes: a traffic condition determination unit determining a traffic condition when a vehicle travels in a road zone along a facility; a vehicle behavior determination unit determining whether a payment terminal mounted in the vehicle traveling in the road zone along the facility has made a payment through communication with a facility terminal installed in the facility; and a traffic information generation unit generating traffic information that associates the traffic condition in the road zone with a payment service of the facility, if it is determined that a payment has been made through communication.

According to a second aspect of the present invention, in the traffic information processing system of the first aspect, the traffic condition determination unit obtains a congestion detection time when congestion was detected and a payment time when payment was made through communication, and a guidance information generation unit is further provided for calculating a congestion wait time based on the congestion detection time and the payment time, and specifying the congestion wait time.

A statistical processing device according to a third aspect of the present invention includes: a probe information acquisition unit obtaining probe information from an onboard device; a traffic condition determination unit determining a traffic condition in a road zone along a facility based on the probe information; a vehicle behavior determination unit determining whether a payment terminal mounted in a vehicle traveling in the road zone along the facility has made a payment through communication with a facility terminal installed in the facility; and a traffic information generation unit generating traffic information that associates the traffic condition in the road zone with a payment service of the facility, if it is determined that a payment has been made through communication.

According to a fourth aspect of the present invention, in a traffic information processing method for generating traffic information using a control unit that determines a traffic condition in a road zone along a facility, the control unit determines whether a payment terminal mounted in a vehicle traveling in the road zone along the facility has made a payment through communication with a facility terminal installed in the facility; and generates the traffic information that associates the traffic condition in the road zone with a payment service of the facility, if it is determined that a payment has been made through communication.

According to a fifth aspect of the present invention, in a traffic information processing program for generating traffic information using a control unit that determines a traffic condition in a road zone along a facility, the control unit functions as a vehicle behavior determination unit determining whether a payment terminal mounted in a vehicle traveling in the road zone along the facility has made a payment through communication with a facility terminal installed in the facility; and a traffic information generation unit generating the traffic information that associates the traffic condition in the road zone with a payment service of the facility, if it is determined that a payment has been made through communication.

According to the first aspect of the present invention, the traffic information processing system determines whether a payment has been made through communication between the payment terminal and the facility terminal. If a payment has been made, then the traffic condition along the facility is associated with the payment service. Therefore, the traffic condition can be determined based on a vehicle waiting to use a payment service and the factor of a traffic condition such as congestion can also be determined. It is thus possible to generate detailed road traffic information.

According to the second aspect of the present invention, the traffic information includes the congestion wait time based on the congestion detection time and the payment time. Therefore, the congestion wait time can be calculated and wait time information generated.

According to the third aspect of the present invention, the statistical processing device determines whether a payment has been made through communication between the payment terminal and the facility terminal. If a payment has been made, then the traffic condition along the facility is associated with the payment service. Therefore, the traffic condition can be determined based on a vehicle waiting to use a payment service and the factor of a traffic condition such as congestion can also be determined. It is thus possible to generate detailed road traffic information.

According to the fourth aspect of the present invention, it is determined whether a payment has been made through communication between the payment terminal and the facility terminal. If a payment has been made, then the traffic condition along the facility is associated with the payment service. Therefore, the traffic condition can be determined based on a vehicle waiting to use a payment service and the factor of a traffic condition such as congestion can also be determined. It is thus possible to generate detailed road traffic information.

According to the fifth aspect of the present invention, in accordance with the traffic information processing program, it is determined whether a payment has been made through communication between the payment terminal and the facility terminal. If a payment has been made, then the traffic condition along the facility is associated with the payment service. Therefore, the traffic condition can be determined based on a vehicle waiting to use a payment service and the factor of a traffic condition such as congestion can also be determined. It is thus possible to generate detailed road traffic information.

BEST MODE FOR CARRYING OUT THE INVENTION

First Embodiment

Figure 1:
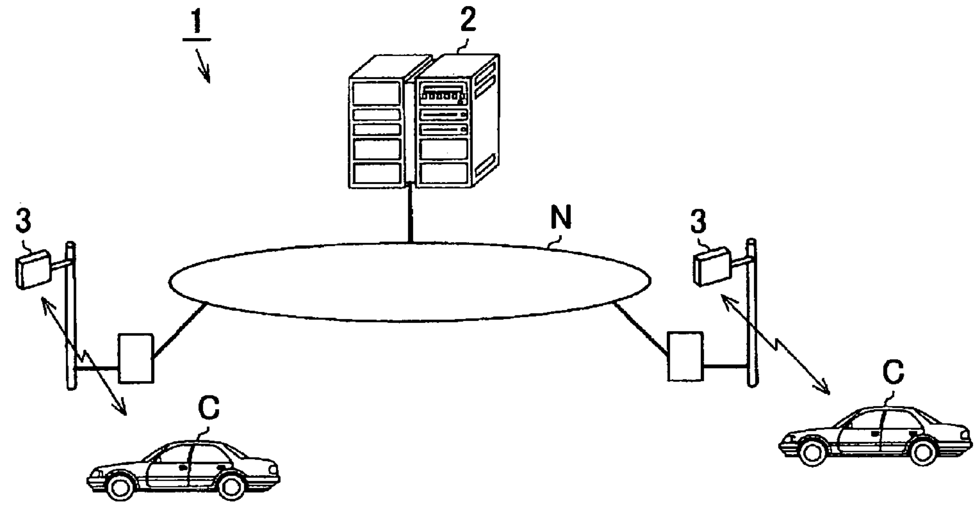
FIG. 1 is a schematic diagram of a probe system.

Hereinafter, an embodiment realizing the present invention will be described with reference to FIGS. 1 to 8. FIG. 1 is a schematic diagram of a probe system 1 serving as a traffic information processing system according to the present embodiment. The probe system 1 includes a probe server 2, a transponder 3, and a navigation device 10 (see FIG. 2) that structures a traffic information processing system mounted in a vehicle C. The probe server 2 and the transponder 3 are connected in a manner capable of sending and receiving various data via a network N formed from a private line or a public line network. The transponder 3 is installed along a road and receives probe data from the navigation device 10 mounted in the vehicle C through wireless communication.

The navigation device 10 sends probe data that includes a host vehicle position, time, and travel information, and the transponder 3 sends the obtained probe data to the probe server 2 via the network N. The probe server 2 performs statistical processing of the probe data to generate road traffic data that includes congestion information, a travel time, or the like, which the probe server 2 then distributes to the navigation device 10.

A hardware configuration of the navigation device 10 will be explained next with reference to FIG. 2. The navigation device 10 is provided with a control unit 11. The control unit 11 includes a CPU 20, a RAM 21, a ROM 22, a vehicle-side interface (I/F) 23, a communication interface (I/F) 24, and an identification data storage unit 25. The RAM 21 is formed from a nonvolatile memory in the present embodiment, and temporarily stores various data, as well as a flag used in the generation of probe data. The control unit 11 structures a traffic condition determination unit, a vehicle behavior determination unit, a traffic information generation unit, and a control unit. In addition, a traffic information processing program is stored in the ROM 22 or a storage unit (not shown).

Based on detection signals obtained via the vehicle-side I/F 23 from a GPS (Global Positioning System) receiver 40, a vehicle speed sensor 41, and a gyro sensor 42, the CPU 20 identifies the host vehicle position using radio navigation and autonomous navigation.

Also, the CPU 20 obtains via the vehicle-side I/F 23 an ignition switch position, i.e., ON, OFF, ACC (accessory), or the like, from an electronic control unit (referred to as an ECU 43 below) mounted in the vehicle C.

The navigation device 10 is capable of reading out various respective data from a geographic information storage unit 26 and a POI (Point of Interest) information storage unit 27, which are formed from a built-in hard disk or an external storage medium such as an optical disk. Stored in the geographic storage unit 26 are route network data (referred to as route data 31 below) and map drawing data 32.

The route data 31 includes a link ID, a connection node, a road type, and a link cost. The node is a data element representing an intersection, a road endpoint, or the like; the link is a data element that connects nodes.

The map drawing data 32 is stored per mesh, with such meshes dividing up a national map, and the map drawing data 32 includes background data in order to draw roads, urban areas, facilities, and the like and road shape data specifying the shape of a road. The control unit 11 performs map matching wherein the road shape data and a travel path are matched to identify the host vehicle position on a road.

Stored in the POI information storage unit 27 is POI data 33 for points (facilities). The POI data 33 includes an area code and a genre as management data. The genre is a supermarket, fast food restaurant, or the like, for example. In addition, the POI data 33 includes a facility name, coordinates, and a link ID belonging to each area and genre.

Also, the control unit 11 obtains via the communication I/F 24 a signal that indicates whether a payment has been made through an onboard LAN or wireless communication from a payment terminal 45 mounted in the vehicle C.

Figure 3:
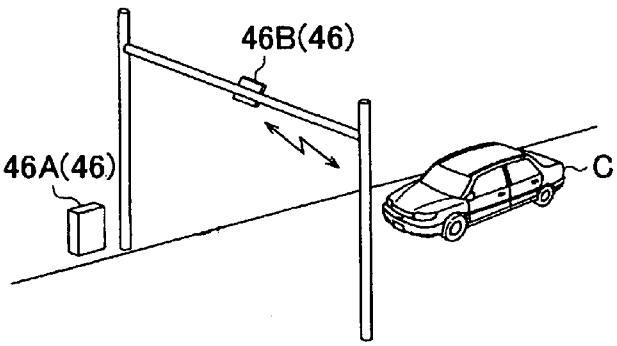
FIG. 3 is a schematic diagram of a DSRC payment system.

The payment terminal 45 will be explained here. The payment terminal 45 is a terminal that makes a payment using DSRC (Dedicated Short Range Communication) at a so-called drive-through or the like, which is a payment service provided by a store, and into which an IC card such as a credit card can be inserted. A store payment clearing device 46 is installed in a store providing a drive-through service, and communicates with the payment terminal 45 of the vehicle C that has entered a predetermined area. As FIG. 3 shows, the store payment clearing device 46 is provided with a communication control device 46A, and a wireless communication unit 46B having a communication area of approximately several meters.

For example, when the vehicle C approaches the store payment clearing device 46, the communication control device 46A performs certification of the payment terminal 45 of the vehicle C via the wireless communication unit 46B. Once certification is complete, a product order can be accepted. At such time, a screen for ordering a product may be displayed via the wireless communication unit 46B on a display 35 (see FIG. 2) of the navigation device 10, and it may be possible to select a product using an operation panel or the like installed on the store side.

After a product is selected, the communication control device 46A calculates a monetary amount of the product and performs payment processing for the payment terminal 45. Specifically, the communication control device 46A accesses the IC card inserted in the payment terminal 45 and reads out data from a built-in chip of the IC card. Depending on the case at this time, the communication control device 46A displays a fee or the like using the display 35 (see FIG. 2) of the navigation device 10 or the operation panel installed on the store side, and prompts the driver to input a PIN for confirming the payment made. After a predetermined operation is performed using the display 35 or the operation panel in this case, the communication control device 46A accesses a payment server (not shown) and clears the payment.

Following completion of fee payment processing on the vehicle side, the payment terminal 45 sends a payment completion notification to the control unit 11. After receiving the payment completion notification, the control unit 11 determines that the vehicle C has made a DSRC payment, and uses this as information for determining a factor of the traffic condition around the facility.

Figure 4:
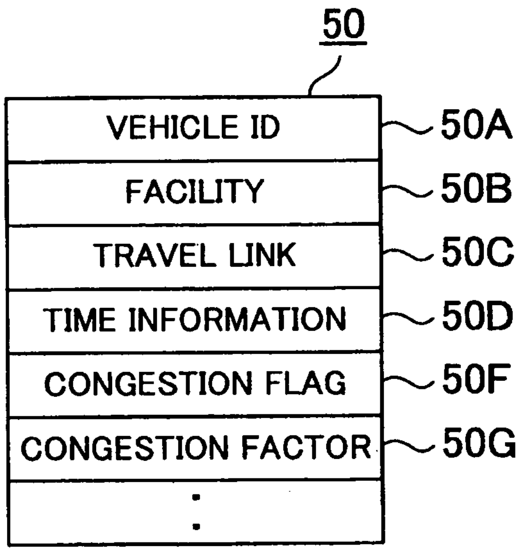
FIG. 4 is a conceptual diagram for explaining a data structure of probe data.

As mentioned above, the control unit 11 also generates probe data 50 serving as traffic information, which the control unit 11 then sends to the transponder 3. FIG. 4 is a conceptual diagram for explaining a data structure of the probe data 50. The probe data 50 is data generated by the control unit 11 when congestion is detected along a facility, and the probe data 50 has a vehicle ID 50A, a facility 50B, a travel link 50C, time information 50D, a congestion flag 50F, and a congestion factor 50G.

The vehicle ID 50A is the same identification data as the vehicle ID 30 stored in the identification data storage unit 25. The facility 50B is identification data for a facility the vehicle C has entered, and the travel link 50C includes a link ID when the control unit 11 detected a congestion and a required time for traveling the link. The time information 50D has at least a congestion detection time when the control unit 11 detected congestion, and also has either a payment time or a parking time. The payment time is a time at which a DSRC payment was cleared, and the parking time is a time at which the ignition switch is turned off.

The congestion flag 50F is a flag indicating whether there is a congestion line along a facility, and "1" indicates that a congestion line is occurring. When the congestion flag 50F is set, the control unit 11 first determines whether the vehicle C is lined up in the congestion line on the road zone along the facility. A known procedure can be used for such processing. For example, it is determined whether a state in which the vehicle speed is equal to or less than a predetermined speed (e.g. 10 kilometers/h) continues for at least predetermined time; and if this condition is met, then it is determined that the vehicle C is in a congestion line.

If it is determined that the vehicle C is in a congestion line, then the control unit 11 refers to the host vehicle position, the route data 31 or the map drawing data 32, and the POI data 33 to determine whether the host vehicle position is in a lane along the facility. A lane along the facility is a lane from which a vehicle can enter the facility. At such time, it may be determined whether the facility around the host vehicle position is a facility where congestion is likely to occur, such as a supermarket. If it is determined that the host vehicle position is in the above lane, then the control unit 11 determines that the vehicle C is in a congestion line for entering the facility, and sets the congestion flag 50F to "1".

The congestion factor 50G indicates a factor of congestion detected by the control unit 11 after the vehicle C enters the facility. To set the congestion factor 50G, the control unit 11 determines whether the payment completion notification has been received from the payment terminal 45. For example, the control unit 11 determines whether the payment completion notification has been received after the vehicle C enters the facility while the ignition switch is at a position other than OFF (or "LOCK"). If it is determined that the payment completion notification has not been received, then the control unit 11 sets the congestion factor 50G to an initial value of "0". Alternatively, if the ignition switch is turned off before the payment completion notification has been received, then the control unit 11 determines that the vehicle C is parked in the parking lot and sets the congestion factor to "1" indicating a parking lot wait. In such case, the time at which the ignition switch was turned off is temporarily stored in the RAM 21. Meanwhile, if it is determined that the payment completion notification has been received while the ignition switch is at a position other than OFF, then the control unit 11 sets the congestion factor 50G to "2" indicating a drive-through wait.

Figure 2:
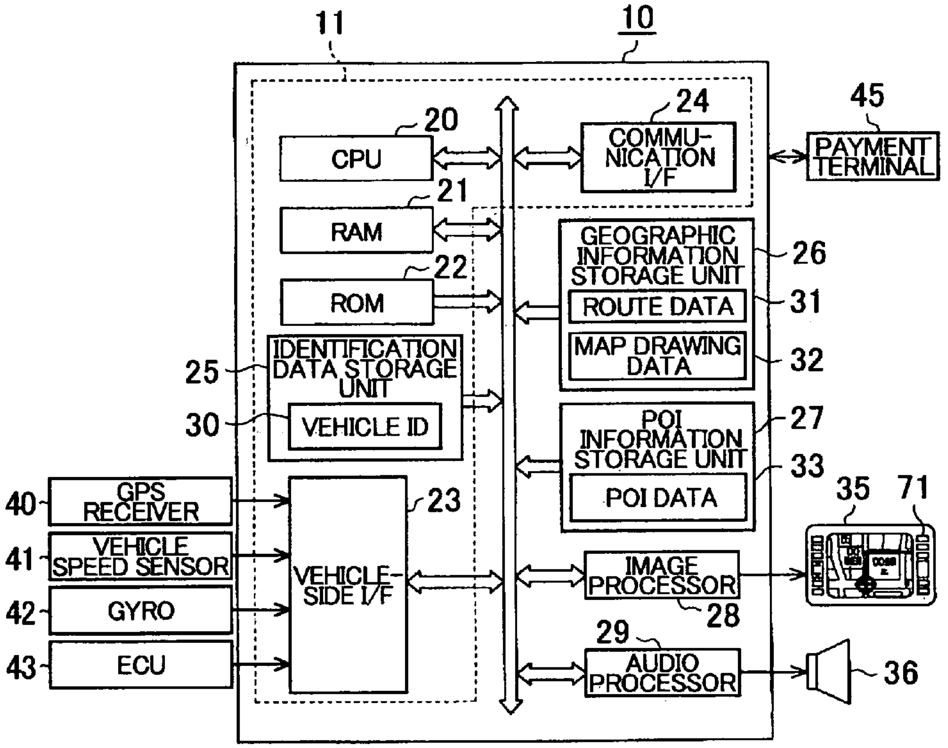
FIG. 2 is a block diagram for explaining a hardware configuration of a navigation device.

As FIG. 2 shows, the navigation device 10 also includes an image processor 28 and an audio processor 29. The image processor 28 reads out the map drawing data 32 to show a map screen 71 on the display 35, and depending on road traffic data received from the probe server 2 also shows a traffic guidance display regarding an approaching congestion/crowded zone and factors thereof. The audio processor 29 outputs voice guidance regarding the approaching congestion/crowded zone and factors thereof from a speaker 36 provided in the vehicle cabin in accordance with the road traffic data received from the probe server 2.

Figure 5:
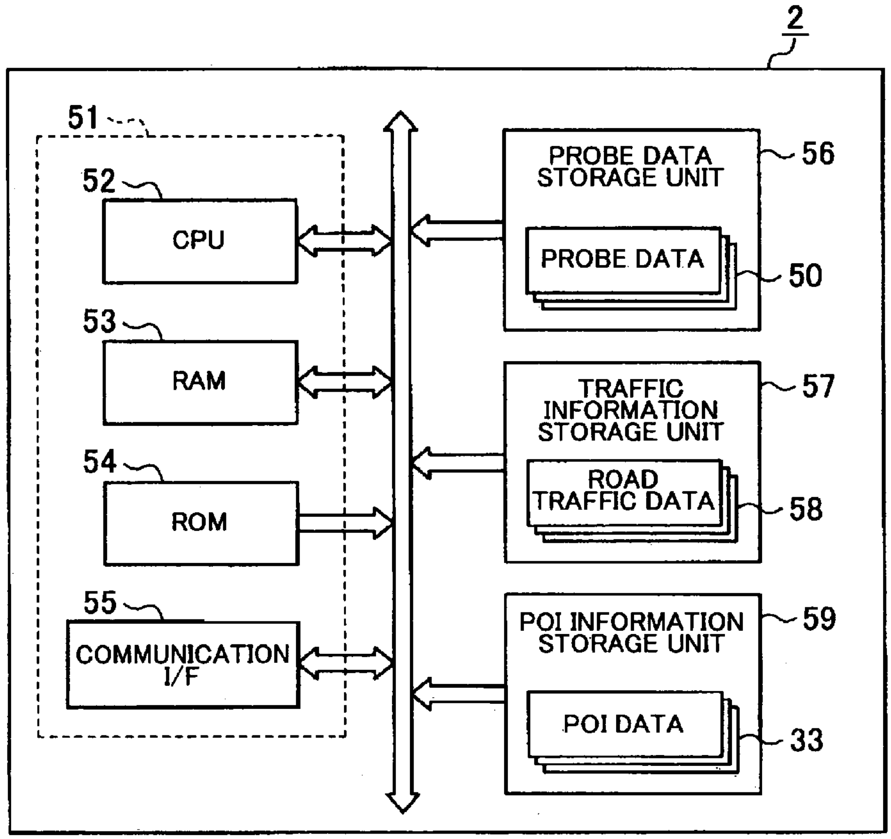
FIG. 5 is a block diagram for explaining a hardware configuration of a probe server.

A hardware configuration of the probe server 2 will be explained next with reference to FIG. 5. The probe server 2 includes a computer 51 formed from a CPU 52, a RAM 53, a ROM 54, and a communication interface (I/F) 55. The probe server 2 also includes a probe data storage unit 56, a traffic information storage unit 57, and a POI information storage unit 59. The computer 51 structures a guidance information generation unit and a probe information acquisition unit. In addition, a statistical program is stored in the ROM 22 or a storage unit (not shown).

The probe data 50 received from the navigation devices 10 is temporarily stored in the probe data storage unit 56. The road information storage unit 57 stores road traffic data 58. The POI information storage unit 59 stores the POI data 33 pertaining to points (facilities).

The computer 51 performs statistical processing using the probe data 50 temporarily stored in the probe data storage unit 56, and generates the road traffic data 58. For example, the computer 51 performs statistical processing of a plurality of probe data 50 having the same facility 50B among the accumulated probe, data 50 to determine whether there is congestion along the facility.

If it is determined that there is congestion along the facility, then the computer 51 extracts the congestion factor 50G. If the congestion factor 50G is set to "0", then the congestion factor is unknown. Therefore, the computer 51 generates the road traffic data 58 specifying only the congestion zone and sends the road traffic data 58 to the surrounding vehicles C.

If the congestion factor 50G is "1", that is, if the probe data 50 indicating a parking lot wait is accumulated, then the computer 51 reads out the time information 50D of the probe data 50 to approximately calculate the time the vehicle C has been in the congestion line. For example, when the congestion detection time included in the time information 50D specifies "11:00" and the parking time similarly included in the time information 50D specifies "11:15", then it is estimated that the time the vehicle C has been in the congestion line is approximately 15 minutes. The computer 51 then generates the road traffic data 58 that provides guidance regarding the congestion factor being a parking lot wait and the estimated wait time being 15 minutes. Such road traffic data 58 is subsequently distributed via the transponder 3 to the vehicles C around the point where the congestion line has occurred.

Meanwhile, if the congestion factor 50G is "2", that is, if the probe data 50 indicating a drive-through wait is accumulated, then it is determined that the congestion line along the facility is congestion due to waiting for a drive-through. The computer 51 then reads out the time information 50D of the probe data 50 to approximately calculate the time the vehicle C has been in the congestion line. For example, when the congestion detection time included in the time information 50D specifies "11:00" and the payment time similarly included in the time information 50D specifies "11:10", then it is estimated that the time the vehicle C has been in the congestion line is approximately 10 minutes. The computer 51 then generates the road traffic data 58 that provides guidance regarding the congestion factor being a drive-through wait and the estimated wait time being 10 minutes. Such road traffic data 58 is subsequently distributed to the vehicles C around the point where the congestion line has occurred.

Figure 6:
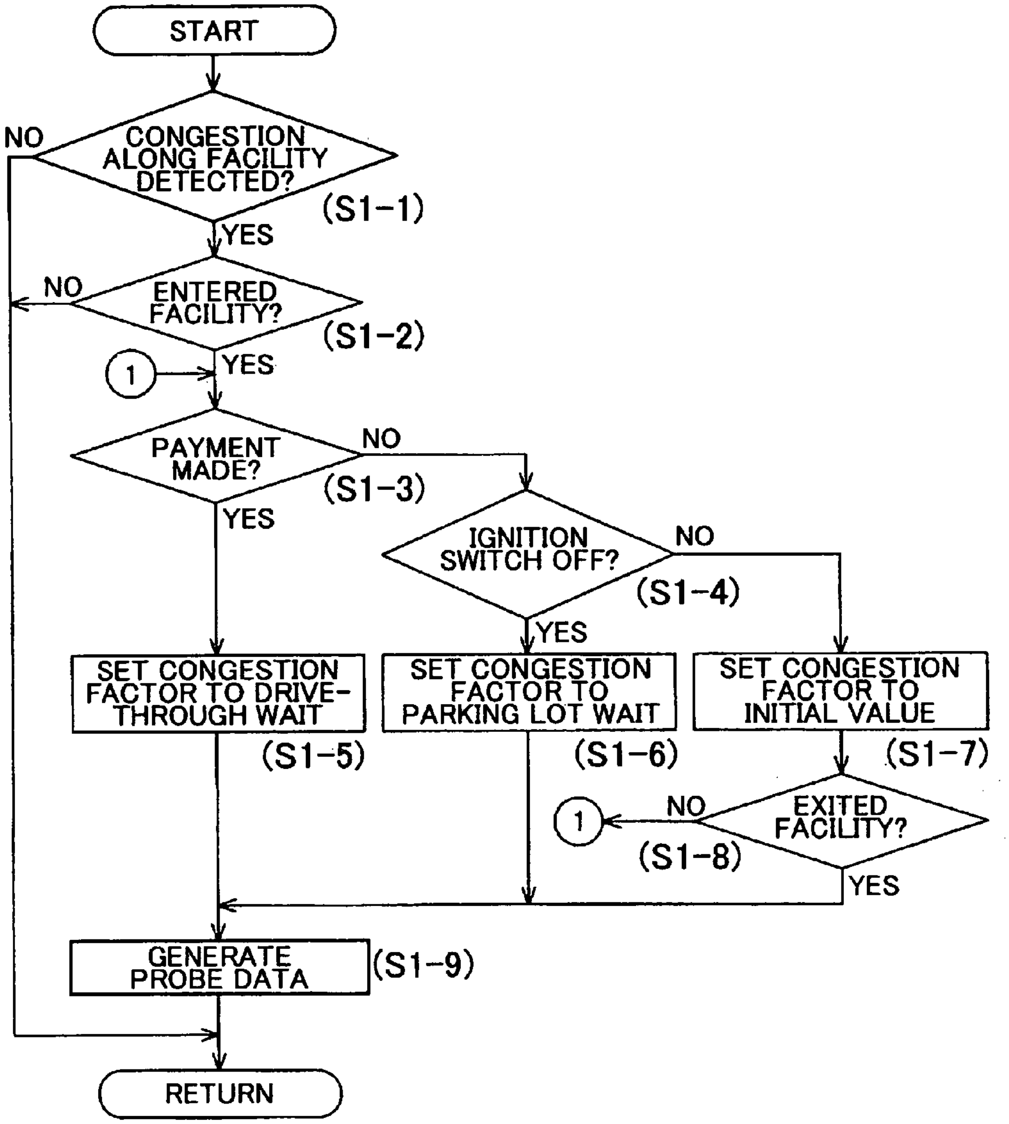
FIG. 6 is a flowchart of probe data generation processing according to a first embodiment.

A processing procedure according to the present embodiment will be explained next with reference to FIG. 6. FIG. 6 is a flowchart showing probe data generation processing of the navigation device 10.

Figure 7:
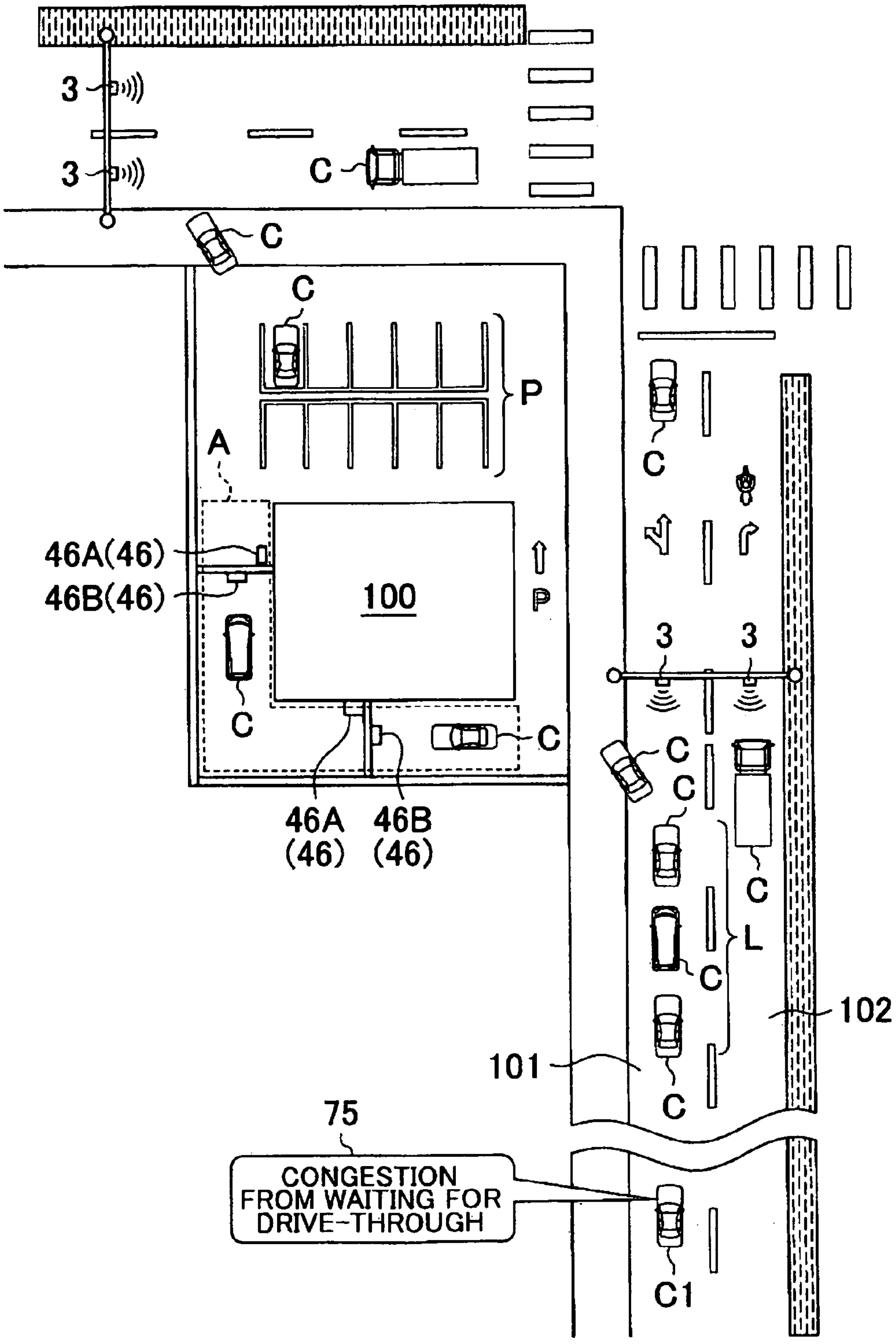
FIG. 7 is a conceptual diagram for explaining a road zone around a drive-through facility.

As FIG. 6 shows, the control unit 11 of the navigation device 10 determines by the above-described procedure whether congestion has occurred along a facility (step S1-1). For example, as shown in FIG. 7, if the vehicle C has traveled at a speed equal to or less than a predetermined speed for at least a predetermined time in a lane 101 for entering a store 100, which is a facility such as a supermarket or fast food restaurant, then it is determined that a congestion line L along the facility exists in that lane (YES at step S1-1). The congestion flag 50F set to "1" is temporarily stored in the RAM 21 or the like, and the routine proceeds to step S1-2. The time at such point is also temporarily stored in the RAM 21 or the like as the congestion detection time.

Meanwhile, if the control unit 11 determines that the vehicle C has not traveled for at least a predetermined time at a speed equal to or less than a predetermined speed, or determines that the vehicle C is traveling in a right-turn lane 102, or determines that there is no facility around the host vehicle position, then it is determined that the congestion line L along the facility does not exist (NO at step S1-1). The control unit 11 then sets the congestion flag 50F to "0" and repeats the processing at step S1-1.

At step S1-2, the congestion flag 50F is being set to "1" and the control unit 11 determines whether the vehicle C has entered the facility based on the host vehicle position and the like. If it is determined that the vehicle C has not entered the facility (NO at step S1-2), then the routine returns to step S1-1 and the above determination is repeated. If it is determined that the vehicle C has entered the facility (YES at step S1-2), then the routine proceeds to step S1-3.

At step S1-3, it is determined whether a DSRC payment has been made. As described above, the control unit 11 determines whether the payment completion notification has been received from the payment terminal 45. If it is determined at step S1-3 that no payment has been made (NO at step S1-3), then the routine proceeds to step S1-4.

At step S1-4, with no reception of the payment completion notification, it is determined whether the ignition switch has been turned off based on the ECU 43. For example, after the vehicle C lines up in the congestion line L along the facility and parks in a parking lot P, the ignition switch is turned off without any payment processing performed using DSRC communication. In such case, it is determined that the ignition switch has been turned off with no payment completion notification received (YES at step S1-4), and the routine proceeds to step S1-6. At step S1-6, the control unit 11 sets the congestion factor 50G as a parking lot wait and temporarily stores the congestion factor 50G in the RAM 21 or the like.

Alternatively, with no reception of the payment completion notification, if it is determined at step S1-4 that the ignition switch is at a position other than OFF (NO at step S1-4), then the control unit 11 sets the congestion factor 50G to the initial value of "0" (step S1-7). After setting the congestion factor 50G to the initial value, the control unit 11 determines whether the vehicle C has exited the facility (step S1-8). If, after entering the facility, the vehicle C exits without making a payment or parking (YES at step 1-8), then the probe data 50 is generated with the congestion factor 50G set to the initial value of "0" (step S1-9). The generated probe data 50 is temporarily stored in the RAM 21. If it is determined that the vehicle C has not exited the facility (NO at step S1-8), then the routine returns to step S1-3 and it is determined whether a payment has been made.

Meanwhile, once the control unit 11 obtains the payment completion notification, it is determined at step S1-3 that a payment was made (YES at step S1-3), and the control unit 11 sets the congestion factor 50G to a drive-through wait (step S1-5). The time at such point is also temporarily stored in the RAM 21 or the like as the payment time.

For example, as shown in FIG. 7, in the case of a payment area A around a store where the payment terminal 45 and the wireless communication unit 46B are capable of communication, the congestion flag 50F of the vehicle C before entering the payment area A is "1" and the congestion factor 50G is set to "0". If the payment terminal 45 and the wireless communication unit 46B communicate and the payment terminal 45 generates the payment completion notification, then the congestion flag 50F of the vehicle C is set to "1" and the congestion factor 50G is set to "2".

After the congestion factor 50G is set to a drive-through wait, a parking lot wait, or to the initial value as explained in steps S1-5 to S1-7, the control unit 11 generates the probe data 50 using the congestion detection time, the congestion flag 50F, and the congestion factor 50G stored in the RAM 21 or the like, as well as the facility the vehicle entered, the vehicle ID 30, and the payment time or the parking time (step S1-9). The generated probe data 50 is temporarily stored in the RAM 21.

Following generation of the probe data 50, the control unit 11 sends the probe data 50 via the communication I/F 24 at a predetermined timing. The timing at which the probe data 50 is sent is not particularly limited. For example, the probe data 50 may be sent when a data request is received from the transponder 3, or the probe data 50 may be sent to a transponder 3 in the vicinity at a predetermined time interval. Note that in the present embodiment, the above determinations are repeated until the probe data 50 is generated, and the probe data 50 is sent following generation of the probe data 50.

After the probe data 50 is sent, the control unit 11 initializes the congestion flag 50F, the congestion factor 50G, the congestion detection time, the payment time, and the like.

Once the probe server 2 receives the probe data 50, the probe server 2 temporarily stores the probe data 50 in the probe data storage unit 56 and generates the road traffic data 58 as described above. At such time, the computer 51 performs statistical processing of a plurality of probe data 50 having the same facility 50B to determine whether there is congestion with respect to a specific facility.

If there is congestion along a facility, then the congestion factors 50G of the respective probe data 50 are extracted and statistical processing performed to identify the congestion factor 50G. Also, the respective data included in the time information 50D is averaged to approximately calculate a wait time to use the drive-through or a wait time to park in the parking lot P. The congestion factor 50G, information pertaining to the wait time, the facility name where congestion is occurring and the like are included in the road traffic data 58, and such road traffic data 58 is sent via the transponder 3 to the vehicle C lined up in the congestion line L and to a following vehicle C1 and the like in the lane 101 where the congestion line L is occurring.

Figure 8A:
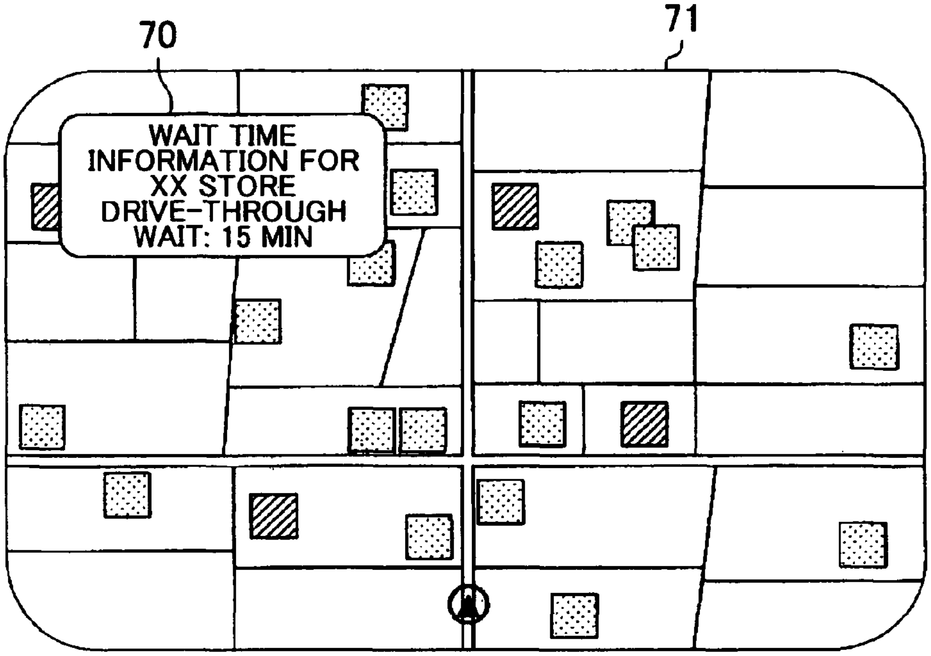
FIG. 8A is a drawing of a screen for drive-through waiting.
Figure 8B:
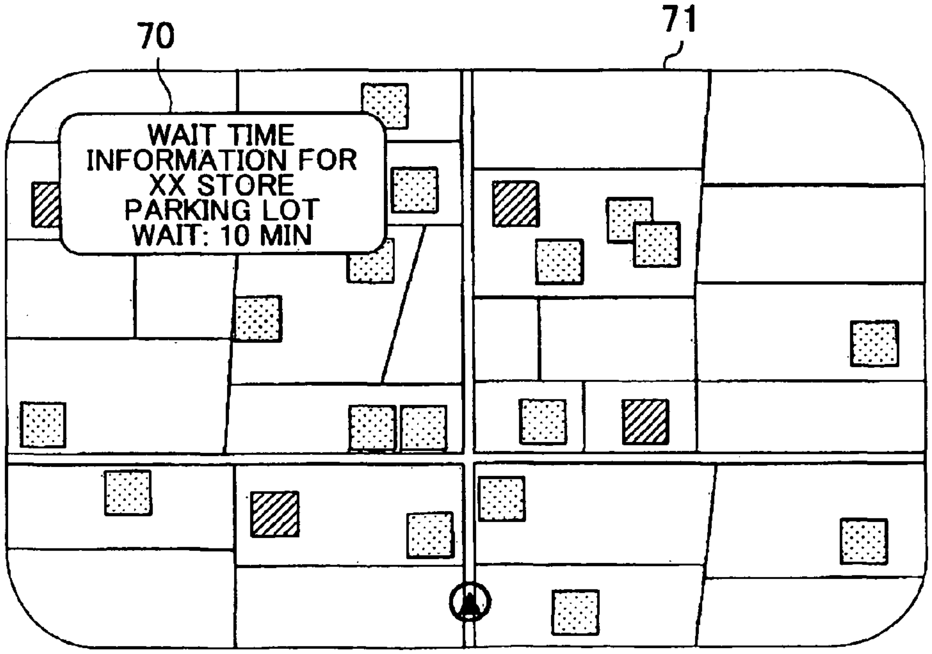
FIG. 8B is a drawing of a screen for parking lot waiting.

Once the navigation device 10 of the following vehicle C1 receives the road traffic data 58, the navigation device 10 uses the image processor 28 to show a guidance display 70 such as illustrated in FIG. 8 on the display 35. FIG. 8A is a drawing of a screen when the congestion factor 50G is set to a drive-through wait, and FIG. 8B is a drawing of a screen when the congestion factor 50G is set to a parking lot wait. As FIGS. 8A and 8B show, the guidance display 70 may be partially superimposed on the map screen 71 or displayed over an entire drawable area. Since the congestion factor and the congestion wait time are shown on the guidance display 70, the driver of the following vehicle C1 in the lane 101 can smoothly change to a right-side lane 102 well in advance in order to avoid the congestion. Furthermore, the driver of the vehicle C in the congestion line L can confirm the factor behind the congestion line L and check the wait time. Therefore, it is possible to help keep the driver from becoming stressed while waiting in the congestion.

According to the first embodiment, the following effects can be obtained.

(1) In the first embodiment, the navigation device 10 determines a traffic condition when the vehicle C travels in a road zone along a facility, and determines whether a payment has been made through communication between the payment terminal 45 in the host vehicle and the store payment clearing device 46 installed in the facility. In cases where it is determined that a payment has been made, the probe data 50 associating the traffic condition in the road zone with the payment service of the facility is generated. Accordingly, the probe server 2 can determine the traffic condition based on a vehicle waiting to use a payment service and determine the factor of a traffic condition such as congestion, whereby the road traffic data 58 can be generated to provide guidance regarding the traffic condition. It is thus possible to generate detailed road traffic data 58.

(2) According to the first embodiment, the control unit 11 obtains the congestion detection time when congestion was detected, and the payment time when payment was made or the parking time, which are sent to the probe server 2 as the time information 50D. When there is congestion in the road zone along the facility, the probe server 2 calculates the congestion wait time based on the time information and generates the road traffic data 58 including the congestion wait time. Accordingly, the congestion factor and the congestion wait time can be shown on the display 35 of the vehicle C to which the road traffic data 58 has been distributed. The driver can thus be notified of the congestion wait time, making it possible to help keep the driver from becoming stressed.

Second Embodiment

A second embodiment realizing the present invention will be described next with reference to FIGS. 9 to 11. Note that the second embodiment has a configuration identical to that of the first embodiment except for a modification to the processing procedure. Detailed descriptions of like portions are thus omitted here.

Figure 9:
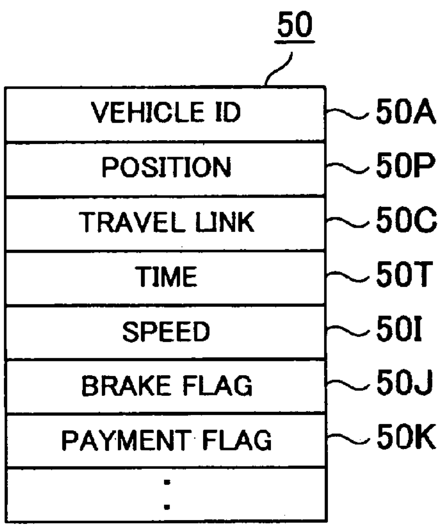
FIG. 9 is a conceptual diagram for explaining a data structure of probe data according to a second embodiment.

FIG. 9 is a schematic diagram of the probe data 50 sent by the navigation device 10 serving as an onboard device of the present embodiment. Similar to the first embodiment, this probe data 50 has a vehicle ID 50A and a travel link 50C. In the present embodiment, the probe data 50 also has a position 50P, a time 50T, a speed 50I, a brake flag 50J, and a payment flag 50K. Note further that the travel link 50C may be omitted.

The position 50P indicates a vehicle position at the time the probe data 50 was generated or sent. The time 50T indicates a time when the probe data 50 was generated or sent. The speed 50I is a vehicle speed calculated based on a vehicle speed pulse when the probe data 50 was generated or sent. The brake flag 50J is a flag indicating whether a brake pedal has been depressed, and is set based on an ON signal or OFF signal obtained from the ECU 43.

The payment flag 50K is a flag indicating whether the control unit 11 has received the payment completion notification. When the control unit 11 receives the payment completion notification while the ignition switch is at a position other than OFF, the value of the payment flag 50K stores in the RAM 21 or the like is set to ON (e.g. “1”). When the ignition switch is turned off, the payment flag 50K is initialized and set to OFF (e.g. “0”).

Figure 10:
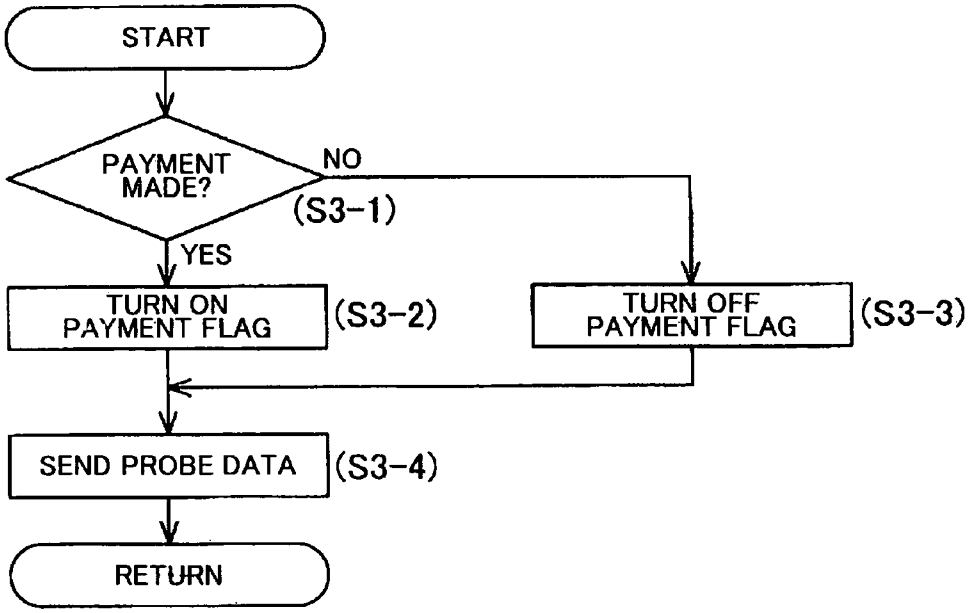
FIG. 10 is a flowchart of probe data generation processing according to the second embodiment.

FIG. 10 is a flowchart showing probe data generation processing of the navigation device 10. Using the same method as in the above embodiment, the control unit 11 determines whether a DSRC payment has been made at a drive-through (step S3-1).

If the control unit 11 receives the payment completion notification and determines that a DSRC payment has been made (YES at step S3-1), then the control unit 11 sets the payment flag 50K to ON (step S3-2).

However, if the control unit 11 determines at step S3-1 that a DSRC payment has not been made at a drive-through (NO at step S3-1), then the control unit 11 sets the payment flag 50K to OFF (step S3-3).

The control unit 11 subsequently generates the probe data 50 with the above-described structure, and sends the probe data 50 to the transponder 3 at a predetermined timing (step S3-4). In other words, the control unit 11 communicates only the travel information of the vehicle C and whether a payment has been made, with no detection of congestion or a congestion factor.

Once the probe server 2 receives the probe data 50 via the transponder 3, the probe server 2 accumulates the probe data 50 in the probe data storage unit 56.

Figure 11:
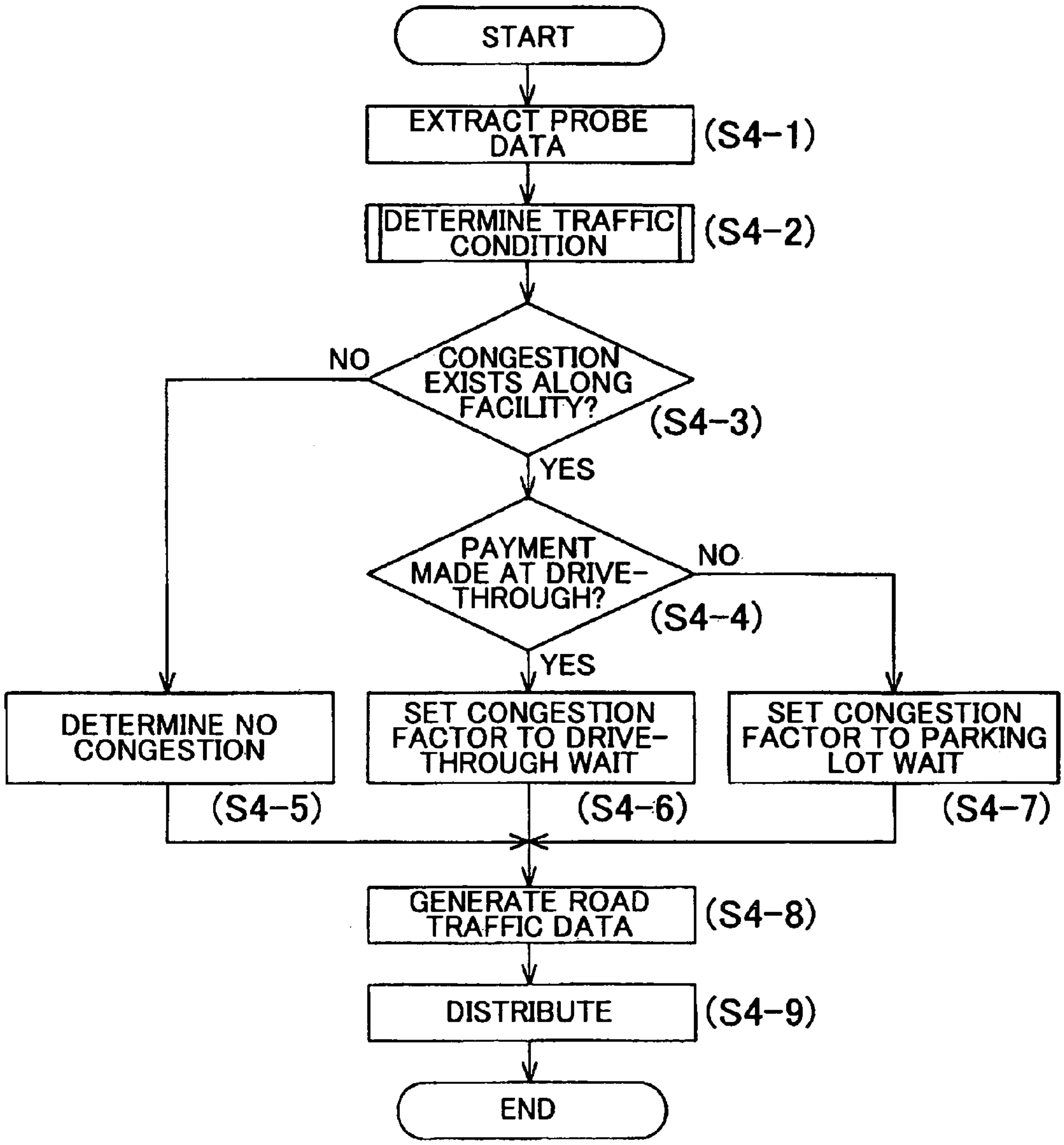
FIG. 11 is a flowchart showing statistical processing of a probe server 2.

FIG. 11 is a flowchart showing statistical processing of the probe server 2. In the present embodiment, the computer 51 structures a traffic condition determination unit, a vehicle behavior determination unit, a traffic information generation unit, and a control unit. In addition, a traffic information processing program is stored in the computer 51.

The computer 51 extracts from the probe data storage unit 56 the probe data 50 sent from the same lane (step S4-1), and uses the extracted probe data 50 to determine the traffic condition of a specific area through a known method (step S4-2). For example, the computer 51 searches a plurality of probe data 50 sent at different times but which have the same vehicle ID 50A, and determines whether the speed 50I thereof is equal to or less than a predetermined speed. Based on the time 50T of the respective probe data 50, it is also determined whether the vehicle C has traveled at a speed equal to or less than the predetermined speed for at least a predetermined time. Furthermore, when multiple sets of such data exists, the position 50P or the travel link 50C thereof is used to determine the occurrence of congestion. In addition, the facility where the congestion is occurring is determined based on the POI data 33.

The computer 51 next determines whether there is congestion along the facility based on the determination processing at step S4-2 (step S4-3). If it is determined that there is no congestion along the facility (NO at step S4-3), then the computer 51 determines that there is no congestion in the area (step S4-5), and the routine proceeds to step S4-8 described later.

However, if the computer 51 determines at step S4-3 that there is congestion along the facility (YES at step S4-3), then the computer 51 determines whether a payment has been made at a drive-through based on the payment flag 50K (step S4-4). At such time, for example, it may be determined whether the probe data 50 with the payment flag 50K set to "1" was received within a predetermined time from the vehicle C lined up in the congestion line L detected at step S4-2.

If it is determined that a payment has been made at a drive-through (YES at step S4-4), then the computer 51 sets the congestion factor as a drive-through wait (step S4-6). However, if the computer 51 determines at step S4-4 that a payment has not been made at a drive-through (NO at step S4-4), then the computer 51 sets the congestion factor as a parking lot wait (step S4-7).

If the congestion factor is set or it is determined that there is no congestion, then the computer 51 generates the road traffic data 58 as traffic information that includes information indicating the congestion factor or no congestion (step S4-8). In cases where the congestion factor is set, the computer 51 compares the probe data 50 collected from the same vehicle, for example, and calculates the wait time based on a time when travel started at a speed equal to or less than the predetermined speed and based on the time 50T of the probe data 50 with the payment flag 50K set to "1". Furthermore, when calculating the wait time of another vehicle C lined up in the same congestion line L, an average wait time or the like is calculated using a plurality of wait times.

Following generation of the road traffic data 58, the computer 51 distributes the generated road traffic data 58 to the vehicle C in the applicable area (step S4-9). According to the second embodiment, the following effects can be obtained.

(3) In the second embodiment, the probe server 2 determines a traffic condition when traveling in a road zone along a facility based on the probe data 50 received from the vehicle C. Based on the payment flag 50K included in the probe data 50, it is determined whether the vehicle C that traveled in the road zone along the facility made a payment through communication between the payment terminal 45 and the store payment clearing device 46 installed in the facility. In cases where it is determined that a payment has been made, the road traffic data 58 associating the traffic condition in the road zone with the payment service of the facility is generated. Accordingly, the probe server 2 can determine the traffic condition based on a vehicle waiting to use a payment service and determine the factor of a traffic condition such as congestion, whereby the road traffic data 58 can be generated to provide guidance regarding the traffic condition. It is thus possible to generate detailed road traffic data 58.

(4) According to the second embodiment, when there is congestion in the road zone along the facility, the probe server 2 calculates the congestion wait time based on the time 50T included in the probe data 50 and generates the road traffic data 58 including the congestion wait time. Accordingly, the congestion factor and the congestion wait time can be shown on the display 35 of the vehicle C to which the road traffic data 58 has been distributed. The driver can thus be notified of the congestion wait time, making it possible to help keep the driver from becoming stressed.

Note that the present embodiments may be modified in the following manner.

The probe data 50 may have a structure other than the data structure described above. In the first embodiment, a structure that excludes the congestion flag 50F is conceivable. In the second embodiment, a structure that excludes the brake flag 50J from the probe data 50 is conceivable.

In the above embodiments, the traffic condition determination unit for determining a traffic condition along a facility is structured from the navigation device 10 or the probe server 2. However, the traffic condition determination unit may be structured from a surveillance camera installed on a roadside and a detection device that analyzes an image from the surveillance camera to determine a traffic condition. In such case, based on the traffic condition received from the detection device and payment information received from the navigation device 10, the probe server 2 determines whether the traffic condition along the facility is caused by entry into the payment area.

In the above embodiments, the POI data 33 may include whether a facility thereof provides a drive-through service. When there is congestion along a facility that provides a drive-through service and the payment terminal 45 of a vehicle lined up in the congestion line outputs the payment completion notification, the congestion factor may be determined as a drive-through wait.

Below is an additional note regarding a technical concept that can be understood from the above embodiments and other examples, as well as effects thereof.

(a) A traffic information processing system according to a first aspect of the present invention is characterized in that, when there is congestion in the road zone and the payment terminal of the vehicle lined up in the congestion line occurring in the road zone makes a payment through communication, the traffic information generation unit determines the congestion factor as a drive-through wait and generates the traffic information providing guidance regarding the congestion factor.

Thus, according to the aspect of the present invention as described in (a) above, when the vehicle lined up in the congestion line occurring in the road zone along the facility makes a payment, the congestion factor can be determined as a drive-through wait. Therefore, it is possible to support smooth travel by also notifying following vehicles in the congestion line of the congestion factor.

The invention claimed is:

1. A traffic information processing system, comprising:

a traffic condition determination unit determining a traffic condition when a vehicle travels in a road zone along a facility;

a vehicle behavior determination unit determining whether a payment terminal mounted in the vehicle traveling in the road zone along the facility has made a payment through communication with a facility terminal installed in the facility or whether an ignition switch of the vehicle is turned off:

a congestion factor setting unit setting a congestion factor to a drive-through wait when it is determined that a payment has been made through communication and setting the congestion factor to a parking lot wait when it is determined that the ignition switch of the vehicle has been turned off; and a traffic information generation unit generating traffic information that associates the traffic condition in the road zone with a name of the facility and the set congestion factor.

2. The traffic information processing system according to claim 1, wherein:

the traffic condition determination unit obtains a congestion detection time when congestion was detected and a payment time when payment was made through communication; and a guidance information generation unit is further provided for calculating a congestion wait time based on the congestion detection time and the payment time and for generating a guidance information specifying the congestion wait time.

3. A statistical processing device, comprising:

a probe information acquisition unit obtaining probe information from an onboard device;

a traffic condition determination unit determining a traffic condition in a road zone along a facility based on the probe information;

a vehicle behavior determination unit determining whether a payment terminal mounted in a vehicle traveling in the road zone along the facility has made a payment through communication with a facility terminal installed in the facility or whether an ignition switch of the vehicle is turned off;

a congestion factor setting unit setting a congestion factor to a drive-through wait when it is determined that a payment has been made through communication and setting the congestion factor to a parking lot wait when it is determined that the ignition switch of the vehicle has been turned off; and a traffic information generation unit generating traffic information that associates the traffic condition in the road zone with a name of the facility and the set congestion factor.

4. A traffic information processing method for generating traffic information using a control unit that determines a traffic condition in a road zone along a facility, the traffic information processing method, comprising:

determining, with the control unit, whether a payment terminal mounted in a vehicle traveling in the road zone along the facility has made a payment through communication with a facility terminal installed in the facility or whether an ignition switch of the vehicle is turned off setting, with the control unit, a congestion factor to a drive-through wait when it is determined that a payment has been made through communication and setting the congestion factor to a parking lot wait when it is determined that the ignition switch of the vehicle has been turned off; and generating, with the control unit, the traffic information that associates the traffic condition in the road zone with a name of the facility and the set congestion factor.

5. A non-transitory computer-readable storage medium storing a computer-executable traffic information processing program for generating traffic information by determining a traffic condition in a road zone along a facility, the traffic information processing program comprising:

instructions for determining whether a payment terminal mounted in a vehicle traveling in the road zone along the facility has made a payment through communication with a facility terminal installed in the facility or whether an ignition switch of the vehicle is turned off;

instructions for setting a congestion factor to a drive-through wait when it is determined that a payment has been made through communication and setting the congestion factor to a parking lot wait when it is determined that the ignition switch of the vehicle has been turned off; and instructions for generating the traffic information that associates the traffic condition in the road zone with a name of the facility and the set congestion factor.

* * * * *